Aug. 15, 1967     R. E. MILLS     3,335,846
CONTAINER
Filed May 5, 1965
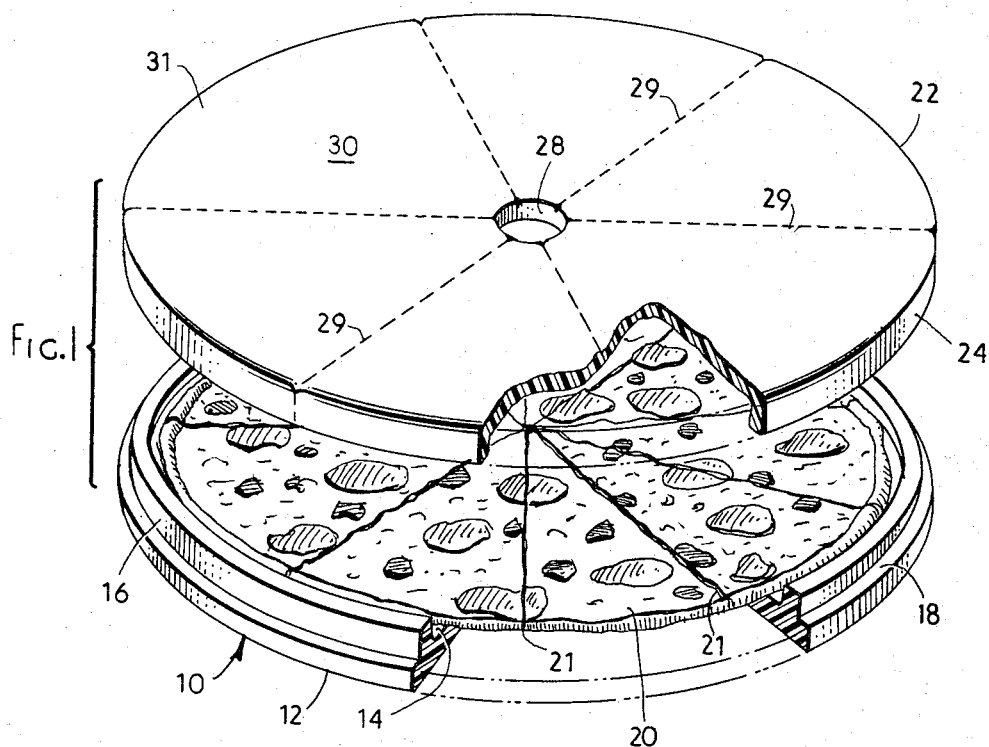
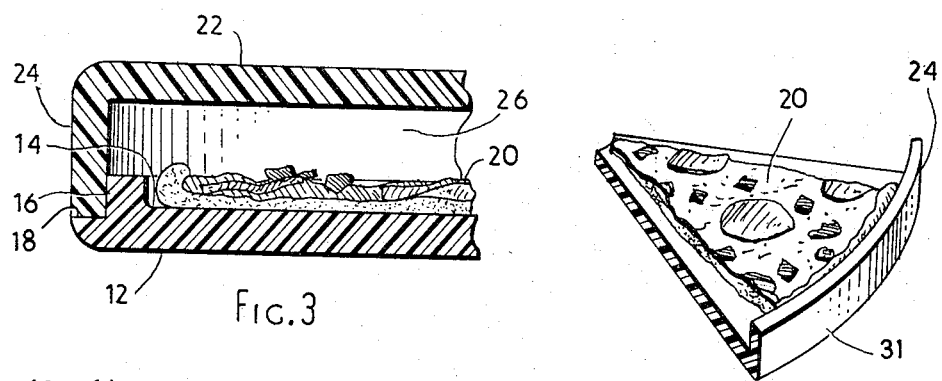
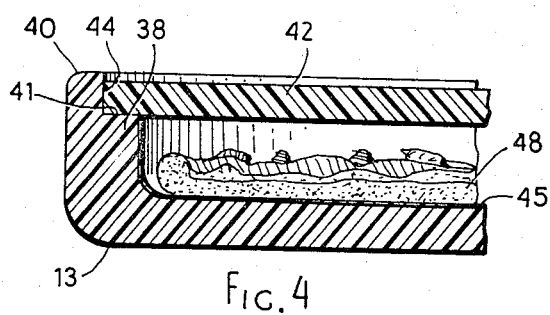
INVENTOR
RONALD E. MILLS
by Albert L. Peffers
ATTORNEY

United States Patent Office 3,335,846
Patented Aug. 15, 1967

3,335,846
CONTAINER
Ronald E. Mills, 1826 Hobson Road,
Fort Wayne, Ind. 46805
Filed May 5, 1965, Ser. No. 453,307
6 Claims. (Cl. 206—4)

ABSTRACT OF THE DISCLOSURE

A food container is provided by a circular base and lid which are formed of expanded plastic and which fit at their circumferences to close the container. The lid has vents for moisture to escape, and is scored so that it may be separated to form mats.

---

This invention relates to a container, and more particularly to a new and improved container for carrying food materials such as pizza, which is carried within the container providing an insulated enclosure for the pizza.

One of the requisites for containing and carrying a heated food product is to seal the container against contamination, and also, to protect the individual from the heat of the food and for preventing run-off of the food juices which may otherwise stain clothing and upholstery. Moreover, it is intended that the container for carrying the food product will keep the food product in a heated condition because of its insulation and will, at the same time, permit escape of vapor from the food so that it will not become soggy or "steamed out."

It is, accordingly, one of the objects of the present invention to provide a novel container for such food products such as pizza pies which have become very popular, especially so as a carry-out item. The container for the pizza pie is inexpensive and can be readily fabricated, and is inexpensive to furnish as a complementary customer article.

It is one of the important features of the present invention that the lid of the container be provided with a plurality of radial score lines to form individual sections which can be broken along the score line to form a coaster or mat for a serving of a pizza pie.

It is an important feature of the present invention that the container not only serve as an inexpensive carrying means for carry-out type of foods but moreover can serve as an insulating container to keep the food warm during transportation of the food from the place of purchase to the home.

It is a further object of the invention to provide an insulation container for hot food which has a plastic impervious coating on the lower portion of the container to prevent absorption by the container of any liquid escaping from the food.

Other objects and features of the present invention will become apparent from a consideration of the following description, which proceeds with reference to the accompanying drawing, wherein;

FIGURE 1 is an exploded view of the container showing the lid and base sections respectively with a pizza pie received in the base and portions of both the lid and base being broken away to illustrate the container;

FIGURE 2 illustrates how the lid is broken up into sections, with one of the sections being shown in FIGURE 2 providing a serving mat for one of the pieces of pizza pie resting on an inverted broken out section of lid;

FIGURE 3 is a fragmentary section view of the container showing it in a closed condition and with the pizza pie contained therein; and, FIGURE 4 is a fragmentary sectional view of a second embodiment of the invention showing a somewhat different arrangement of the lid and base members respectively.

Referring now to the drawings, the container, designated generally by reference numeral 10 includes a base 12 having a centrally located recess 14, and an annular surrounding flange 16, and shoulder 18. The central recess 14 is adapted to receive a pizza pie 20 having score lines 21 which rests on the base and conforms generally with the diameter of the base, being surrounded by the flange 16 which holds it centrally on the base. A cover plate 22 forms a lid or covering and at the outer periphery thereof is a surrounding rib or flange 24 which forms an interference or tight fit with the flange 16 of the base 12. The lid is press fitted thereover against the shoulder 18 to provide an insulated interior which both protects the pizza pie against contamination and also seals the heat within the space 26 and prevents run-off of the food juices of the pizza pie, thereby preventing staining of clothing, upholstery or the like while the pie is being transported from the place of purchase to the home. One or more vent openings 28 are formed in the lid 22 so that steam and other vapors can escape from the space 26, it having been found that unless there is a venting of these vapors they will recondense and cause a sogginess to the pizza pie. The exact number of vent openings can, of course, be made a matter of design preference and neither the number or placement is critical to the invention.

Both the base 12 and the lid 22 are made of an expanded plastic material such as polyethylene, polystyrene or polyurethane, the thickness of the material being such as to provide the necessary strength and insulation property for the pizza pie.

The lid 22 has a number of score lines 29 along the flange 24 and flat circular section 30 so that the lids can be broken into pie-shaped sections 31 which in the inverted position (FIG. 2) provides individual serving mats or receptacles for complementary pie-shaped wedges or slices of the pizza pie. Thus, when the pizza pie is unpacked and is ready to be consumed the lid is pulled off of the base but instead of being discarded, is broken up along the score lines into a number of pie-shaped sections 31, and each section when inverted provides a service mat for the sections of pizza pie which are cut along the score lines 21 and can be placed on the inverted lid sections 31.

The expanded foam plastic material is relatively inexpensive, and can be provided as a complementary item with the sale of a pizza pie and serves as an important promotional feature of the pizza pie since it provides a convenient disposable receptacle for keeping the pie in a heated condition but without in any way detracting from the tastiness of the pie. Also, the disposable container eliminates the need for the conventional cake circle member for supporting the pizza pie and will hold the pizza pie together while it is being carried. There is no opportunity of burning or producing discomfort to the carrier during transportation of the heated pizza pie because the plastic material forming the container has excellent insulating value and will not burn the hands of the carrier.

It will therefore be seen that the various objects of the invention have been fully realized that there is provided an inexpensive insulated container for pizza pies and that one section thereof is breakable into various conveniently shaped and size sections whereon pieces of the pie can be conveniently served.

Referring next to the embodiment of FIGURE 4, the base 13 can include stepped diameter sections 38 and 40 and the lid 42 can be constructed of a flat disc which is press fitted in place, against the shoulder 41 and within the confines of the annular surface 44. The interior of the base is provided with a plastic impervious coating 45 which will prevent absorption by the container of any liquids that may escape from the food. The lid 42 has score lines (not shown) for permitting the breaking up of the lid into the various pie-shaped sections to provide a mat or coaster for the pizza 48 that is cut into pie-shaped pieces which can rest upon the sections of lid 42 and is served thereon.

Although the present invention has been illustrated and described in connection with two selected example embodiments it will be understood that these are illustrative of the invention and are by no means restrictive thereof. It is reasonably to be expected that those skilled in this art can make numerous revisions and adaptations of the invention to fit individual design requirements and it is intended that such revisions and adaptations will be included within the scope of the following claims as equivalents of the invention.

What is claimed is:

1. A shallow container comprising a base of expanded plastic material having a central recess therein for receiving a food article and having an outer annular flange and shoulder surrounding said base, and a lid having an annular flange which is press fitted over said base flange and against said shoulder to form a gripping connection therewith and to form an enclosure for the food article resting on said base, said lid having at least one aperture therein to serve as a vapor opening for the food article, and having a plurality of score lines formed therein to provide separable sections for receiving food servings thereon.

2. The container in accordance with claim 1 wherein said plastic material is comprised of an expanded plastic material selected from the group consisting of polyethylene, polystyrene and polyurethane, and has a relatively fixed cross section to provide both rigidity and insulation for the food article contained therein.

3. A container for carrying a food product and providing both protection and insulation therefor, comprising a base having a substantially flat circular recess and a surrounding flange at the outer periphery thereof, a lid which is complementary with said base and which includes a flange adapted to form a tight fitting connection with said base flange to provide an interior insulated enclosure for the food product supported on said base, said lid having at least one vent opening therein to provide an outlet for vapors emanating from the food product, and a plurality of radial score lines by which said lid is breakable into prescribed sectors adapted in the inverted position thereof to provide serving sections for the food product.

4. A container for carrying a food product and providing both protection and insulation therefor, comprising circular base having an upright circular flange near the outer periphery thereof to form a recess for the food product and having a circular shoulder outside said flange, and a circular lid complementary with said base and having a circular flange adapted to tightly surround said base flange and rest against said shoulder to provide an insulated enclosure for the food product supported on said base, said lid having radial score lines thereon to permit said lid to be broken into sectors for holding portions of the food product, and having at least one vent opening therein to provide an outlet for vapors emanating from the food product.

5. A container for food materials, comprising a light weight plastic material base having a central recess and a stepped diameter outer periphery, and a lid press fitted within said stepped outer periphery and comprising a substantially flat plastic disc having at least one aperture for providing a vent for gaseous vapors which are given off by such food materials and further having a plurality of score lines by which said lid is subdivided into breakable sections each providing a serving section for a portion of the food materials.

6. A disposable container for a hot food product comprising, in combination, a lower section composed of a light weight plastic material, said lower section having a stepped flange surrounding the outer periphery thereof to form a recessed space for receiving the food product, a plastic impervious coating covering the exposed surface of the recessed space, an upper section which is complementary with said stepped flange to form an interference fit with the lower section, and means forming at least one vent opening in the upper section to provide an outlet for vapors emanating from the food carried therein.

References Cited

UNITED STATES PATENTS

| | | | |
|---|---|---|---|
| 1,310,403 | 7/1919 | Hubig | 206—45.32 |
| 3,073,644 | 1/1963 | Baker et al. | 229—32 |
| 3,260,775 | 7/1966 | Orr | 206—46 |

THERON E. CONDON, *Primary Examiner.*

JAMES B. MARBERT, *Examiner.*